United States Patent

Serenyi

[11] Patent Number: 5,773,176
[45] Date of Patent: Jun. 30, 1998

[54] RECHARGEABLE ALKALINE SILVER-ZINC CELL WITH IMPROVED NEGATIVE ELECTRODE

[75] Inventor: Jose R. Serenyi, Quaker Hill, Conn.

[73] Assignee: Yardney Technical Products, Inc., Pawcatuck, Conn.

[21] Appl. No.: 725,069

[22] Filed: Oct. 2, 1996

[51] Int. Cl.[6] .................................................. H01M 4/24
[52] U.S. Cl. ........................... 429/231; 429/229; 429/206; 429/219
[58] Field of Search .................................... 429/231, 229, 429/230, 219, 206

[56] References Cited

U.S. PATENT DOCUMENTS 4,327,157  4/1982  Himy et al. ........................ 429/229 X
5,376,480  12/1994  Shinoda et al. ..................... 429/229 X Primary Examiner—John S. Maples
Attorney, Agent, or Firm—John R. Doherty

[57] ABSTRACT

Substantial improvements to the cycle life of silverzinc cells were obtained by the addition of small amounts of bismuth oxide ($Bi_2O_3$) to the negative zinc electrode, in conjunction with cadmium oxide (CdO) and lead oxide (PbO). These improvements, which can be extended to other zinc-based alkaline batteries, especially nickel-zinc and zinc-air, can also be realized in conjunction with other metal oxides and hydroxides, particularly indium hydroxide [$In(OH)_3$], which, like $Bi_2O_3$, has the additional advantage of being non-toxic.

14 Claims, 1 Drawing Sheet

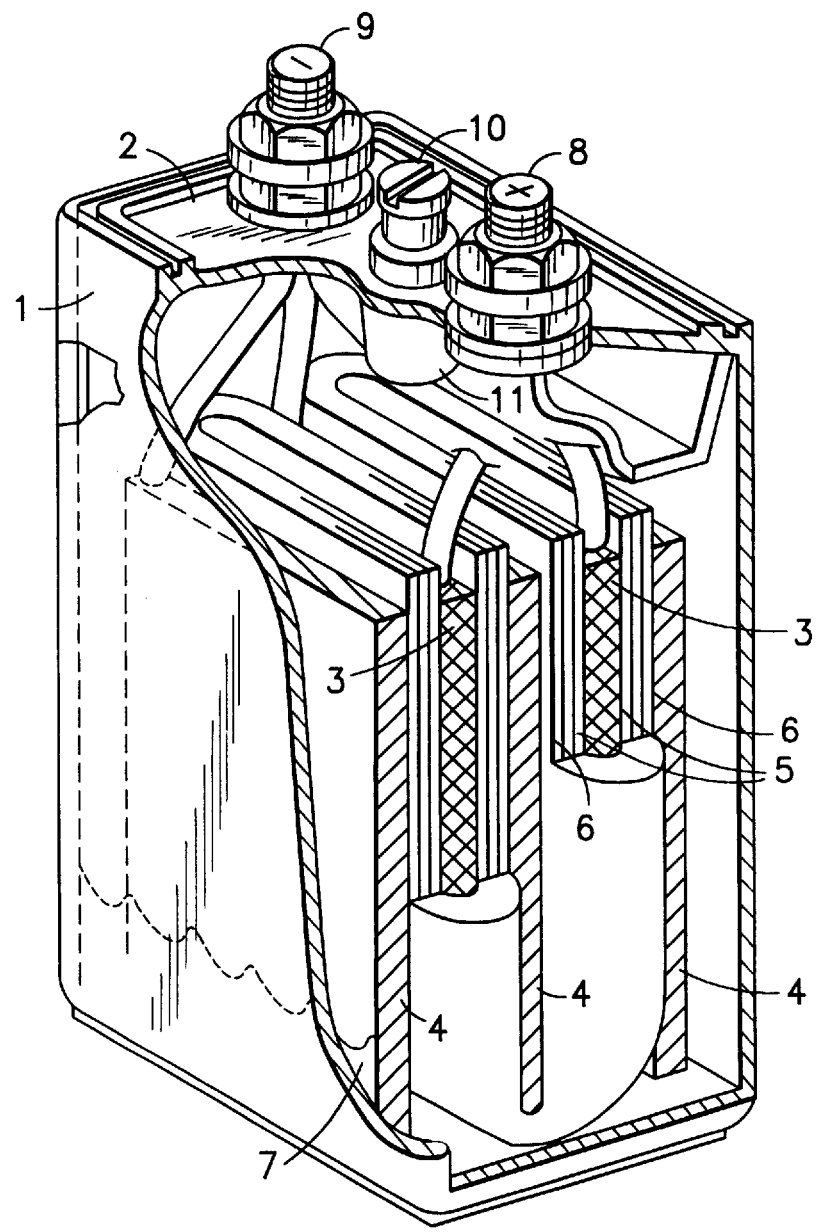

RECHARGEABLE ALKALINE SILVER-ZINC CELL WITH IMPROVED NEGATIVE ELECTRODE

RELATED APPLICATIONS

This application claims priority to my earlier copending provisional application Ser. No. 60/004,770, entitled "Bismuth Oxide as a Binary or Ternary Additive to Zinc Electrodes for use in Silver-Zinc and Other Zinc Based Alkaline Batteries", filed on Oct. 4, 1995.

BACKGROUND OF THE INVENTION (1). Field of the Invention

This application relates generally to rechargeable alkaline electrochemical cells and more particularly to an improved negative electrode for use in rechargeable alkaline zinc-based cells such as the silver-zinc, nickel-zinc, zinc-air and zinc-oxygen cell systems. In a specific aspect, the invention relates to an improved negative zinc electrode containing bismuth oxide ($Bi_2O_3$) as a binary or ternary additive in conjunction with the oxides or hydroxides of other metals having a high hydrogen over-potential.

(2). Description of the Prior Art

Present state-of-the-art silver-zinc cells offer the highest power density among commercially available rechargeable batteries (up to 800 W/kg for continuous discharges and 3,000 W/kg for short duration pulses), along with excellent energy density, a low self-discharge rate and a flat voltage during most of the discharge. However, they suffer from one serious limitation, namely, a relatively rapid capacity degradation, which reduces the number of useful deep discharges to 50–150, even for low-rate applications (e.g. 2 hour rate or lower).

This limitation is due to certain deficiencies of the zinc electrode, which are well known to those familiar with the system, i.e., shape change and formation of zinc dendrites.

Shape change is a phenomenon whereby zinc oxide, formed during the discharge, is partially dissolved in the electrolyte, and redeposited during the charge in a location different from where it originated. The result is a gradual depletion of active material from the top and edges of the electrode; these areas eventually lose all electrochemical activity.

Past attempts at reducing shape change or lessening its effects, such as the use of excess zinc over the amount required for stoichiometric equivalency with the silver, the use of oversized or contoured negatives and the inclusion of binders, e.g., Teflon (tm), neoprene, potassium titanate fibers, have been only marginally effective.

Zinc dendrites are a sharp, needle-like crystalline form of the metal, produced during the late stages of charge and during overcharge. These dendrites have a tendency to puncture the separators, causing failure by internal shorting of the cell.

The formation of zinc dendrites can be controlled by several methods, e.g., careful charge control, use of excess negative active material and use of non-conventional charge methods, such as pulse charging. However, the formation of zinc dendrites remains a threat, especially as the cells get older, requiring constant vigilance and/or costly monitoring equipment.

The above shortcomings apply not only to silver-zinc cells, but also to other zinc based alkaline systems, including nickel-zinc, secondary zinc-air and zinc-oxygen.

Since the development of the silver-zinc battery in the early forties, it has been the common practice to add metal oxides to the zinc electrode. At that time, and until the mid seventies, the additive of choice has been HgO, which is excellent at suppressing hydrogen evolution. However, HgO, normally used in concentrations of 0.5–2% by wt. of the zinc, has two severe disadvantages:

1. HgO accelerates electrode shape change, as described in the following publications: "The Electrochemistry of Metal Oxides Additives in Pasted Zinc Electrodes", J. McBreen et al., Electrochimica Acta, Vol. 26, No. 10, pp 1439–1446, 1981 and "Substitutes for Mercury in Alkaline Zinc Batteries", O. Wagner et al., Proc. 27th Power Sources Symposium, pp 135–138.

2. HgO is a toxic and costly to dispose of material which is under ever increasing regulatory pressure by both federal and state agencies.

These problems have created an increased concern for both manufacturers and users, and inspired the efforts to find a suitable substitute for HgO.

The most successful results were obtained with binary mixtures of the oxides and hydroxides of high hydrogen over-potential metals, including PbO, $SnO_2$, $Tl_2O_3$, CdO, $In(OH)_3$ and $Ga_2O_3$.

U.S. Pat. No. 4,084,047, entitled "Stable Alkaline Zinc Electrode", issued to A. Himy et al. on Apr. 11, 1978, discloses a negative electrode using most of the above compounds and binary combination thereof, in concentrations of 0.5% by wt. to 2.0% by wt. of the active material of the electrode.

From all these compounds and combinations, the one used most widely has been a mixture of 1% by wt. PbO and 2% by wt. CdO.

The above additive offers favorable performance characteristics including low gassing rates, good low temperature and high rate discharge voltages comparable to 1% HgO and somewhat reduced rates of electrode shape change.

The problem with this additive, however, has been that the components are just as toxic as HgO, and also subject to increasingly stricter regulations for manufacture by federal and state agencies. Furthermore, it leaves the issues of shape change and dendrite formation largely unresolved.

A study on the effects of $Bi_2O_3$ alone in zinc negative electrodes was performed by McBreen and Gannon as reported in their article entitled "Bismuth Oxide as an Additive in Pasted Zinc Electrodes, Journal of Power Sources, 15 (1985), pp 169–177. These authors found that the additive is quantitatively reduced to bismuth prior to the deposition of zinc during charge, and forms a conductive matrix of needle-like deposits, which have a beneficial effect on the morphology and stability of subsequent zinc deposits.

Based on the above study, negative electrodes were made by mixing $Bi_2O_3$ with ZnO in concentrations of 5% by wt. and 10% by wt., without any other additive and tested experimentally. However, these tests were unsuccessful, as cells built with such negatives lost capacity rapidly.

Additional work was subsequently carried out using $Bi_2O_3$ in negative electrodes for silver-zinc cells, but this time as a binary additive in conjunction with HgO. The results were again poor.

However, excellent results were obtained when $Bi_2O_3$ was used in combination with PbO and CdO, as explained hereinafter.

It is therefore an important object of the invention to provide an improved negative electrode for use in rechargeable alkaline electrochemical cells.

Another object of the invention is to provide such an improved negative electrode employing bismuth oxide as an additive which will exhibit superior performance and which is non-toxic.

Still another object of the invention is to provide improved rechargeable alkaline electrochemical cells and particularly silver-zinc cells employing a zinc negative electrode which will undergo reduced shape change upon charge and discharge and which accordingly will exhibit extended cycle life.

SUMMARY OF THE INVENTION

The present invention is directed to an improved negative electrode for use in rechargeable alkaline zinc-based electrochemical cells such as silver-zinc, nickel-zinc, zinc-air and zinc-oxygen cells. The negative electrode of the invention is composed predominantly of zinc or zinc oxide as the active material and an additive containing bismuth oxide ($Bi_2O_3$) as a binary or ternary additive in conjunction with at least one additional oxide or hydroxide of a high hydrogen over-potential metal such as lead, cadmium, tin, thallium, indium and gallium.

A preferred combination for use in the negative electrode of the invention comprises a mixture of bismuth oxide ($Bi_2O_3$) with lead oxide (PbO) or cadmium oxide (CdO) as a binary additive or with both lead oxide (PbO) and cadmium oxide (CdO) as a ternary additive. Other metal oxides and hydroxides in addition to lead oxide (PbO) and cadmium oxide (CdO) which can be used in conjunction with bismuth oxide ($Bi_2O_3$) as either binary or ternary additives include stannous oxide, thallium oxide, indium hydroxide and gallium oxide, for example. Of these possible additives, a binary mixture of bismuth oxide ($Bi_2O_3$) and indium hydroxide $In(OH)_3$ is particularly attractive since both components are non-toxic.

The proportions of the bismuth oxide ($Bi_2O_3$) used in the negative electrode will generally vary from about 2% by wt. to about 10% by wt., with a preferred range being from about 2% by wt. to about 5% by wt. of the active material of the electrode. The other metal oxides will each vary in proportion from about 0.25% by wt. to about 2% by wt. In the case of the preferred oxides and hydroxide mentioned above, lead oxide (PbO) should preferably be used in amounts ranging from about 0.5% by wt. to about 2% by wt. while cadmium oxide (CdO) should preferably be used in amounts of from about 1.0% by wt. to about 2.0% by wt. of the active material of the electrode. Preferably, the proportions of indium hydroxide $In(OH)_3$ are from about 0.25% by wt. to about 1% by wt. of the active material of the electrode.

It has been found that the inclusion of such additives in the negative electrode improves the performance of a rechargeable alkaline cells in several ways; the most important being increased cycle life by reducing negative electrode shape change, and decreased rates of hydrogen evolution.

During experimental work leading to the invention, a group of 8.5 Ah cells with $Bi_2O_3$ mixed with ZnO, in combination with other additives (PbO and CdO), performed very well, outlasting the standard cells (PbO and CdO alone) by better than 36% in terms of cycle life. Thus, the combination of these additives greatly exceed the results obtained from the use of $Bi_2O_3$ alone or the PbO plus CdO mixture alone and the combination provides a synergistic effect. This outstanding performance has been repeated in medium size (30 Ah) and large (200 Ah) silverzinc cells. Similar synergistic effects are possible by combining $Bi_2O_3$ with PbO or with CdO alone.

BRIEF DESCRIPTION OF THE DRAWING

The sole figure in the accompanying drawing is a perspective view, part being broken away to show details of construction, of a typical prismatic silver-zinc cell employing zinc negative electrodes made in accordance with the invention.

DESCRIPTION OF THE PREFERRED EMBODIMENTS

Referring to the drawing, a prismatic silver-zinc cell is shown employing a plastic case and cover 1 and 2, respectively, a plurality of positive electrodes 3 and negative electrodes 4, one layer of an inner separator 5, several layers of a main separator 6, a sufficient amount of electrolyte 7, e.g., a concentrated solution of potassium hydroxide in water, a positive terminal 8 and a negative terminal 9 extending through the cover 2 along with a vent valve 10 and a vent trap 11.

The negative electrodes 3 are made in accordance with the invention by mixing the appropriate amounts of bismuth oxide $Bi_2O_3$ and the other additives, e.g., lead oxide (PbO) and/or cadmium oxide (CdO) with zinc oxide (ZnO) to form a homogeneous mixture. This mixture is then wet pasted to form a strip and then cut to size for fabricating the zinc oxide electrodes. Alternately, the strips can be electroformed against inert counter-electrodes to form the zinc electrodes. Other manufacturing procedures, such as mold pressing and extrusion, are of course possible and will readily occur to those skilled in the art.

The invention will now be described in greater detail by reference to the following examples wherein silver-zinc cells, similar in construction to that shown in the sole figure of the drawing, were made with negative zinc electrodes using an additive containing bismuth oxide ($Bi_2O_3$) along with lead oxide (PbO) and cadmium oxide (CdO). The specific electrode formulation used in the examples consisted of approximately 92% by wt. ZnO, 5% by wt. $Bi_2O_3$, 2% by wt. CdO and 1% by wt. PbO. However, it is believed that other formulations, containing the additives listed hereinabove will perform as well or possibly even better than the specific formulation used in the examples. Moreover, while the following examples employ only silver-zinc cells to illustrate the invention, it will be understood that the invention is also applicable to other electrochemical systems which use zinc or zinc oxide as the negative electrode such as nickel/zinc, zinc/air and zinc/oxygen, for example.

EXAMPLE 1

A group of prismatic silver-zinc cells similar to that shown in the sole figure of the drawing, were made with 6 positive electrodes, 7 negative electrodes, an inner separator of woven nylon and a main separator of five layers of silver treated cellophane, in the "dry unformed" (Ag/ZnO) condition. The cells contained 29.9g of active silver and 26.0g of zinc, including all additives (the actual amount of zinc was correspondingly lower), and were filled with 23 cc's of 40 wt. % solution of potassium hydroxide (KOH) in water.

After 3 formation cycles and two capacity check cycles, the cells were placed on a continuous cycling regime, at 50% depth of discharge (4.25 Ah) with capacity checks every 15 cycles, until no longer capable of delivering 4.25 Ah. The rates of charge and discharge were 0.75 A and 4.25 A, respectively.

Three cells of each variation were tested, including standard cells with 1% PbO+2% CdO additive, and cells with $Bi_2O_3$ in the negative electrode in accordance with the invention. The results are shown in Table 1 below.

TABLE 1

| Variation No. | Average Capacity (Ah) | | | | | |
|---|---|---|---|---|---|---|
| | CY 1 (*) | CY 30 | CY 60 | CY 90 | CY 120 | CY 150 |
| 1 (1) | 8.33 | 7.32 | 5.75 | 5.05 | (3) | — |
| 2 (2) | 8.86 | 8.32 | 6.31 | 5.73 | 5.05 | 4.58 (4) |

Notes:
(*) CY: Complete charge/discharge cycle
(1) Standard cells with PbO/CdO
(2) Cells same as (1) with 1% PbO, 2% CdO and 5% $Bi_2O_3$
(3) Failed because of low capacity (<4.25 Ah) after 109, 111 and 113 cycles (avg. = 111 cycles)
(4) Failed for the same reason after 166, 131 and 156 cycles (avg. = 151 cycles)

The minimum voltage at the 4.25 A discharge rate was 1.501V for both variations.

It will be seen from the results shown in Table 1 that silver-zinc cells employing zinc electrodes containing bismuth oxide ($Bi_2O_3$) and a mixture of both lead oxide (PbO) and cadmium oxide (CdO) significantly out-performed the standard cells employing only the oxide mixture of lead and cadmium without the addition of bismuth oxide. The increased cycle life of the bismuth oxide containing electrodes is believed due to reduced negative electrode shape change as well as decreased rates of hydrogen evolution.

EXAMPLE 2

A group of 8.5 Ah cells, similar to those described in example 1, except that the electrodes were "dry charged" (AgO/Zn) was tested at the same regime. In this case, a second group of standard cells containing 1% HgO were also tested. The results are shown in Table 2.

TABLE 2

| Variation No. | Average Capacity (Ah) | | | | | | |
|---|---|---|---|---|---|---|---|
| | CY 1-2 | CY 30 | CY 60 | CY 90 | CY 120 | CY 150 | CY 180 |
| 1 (1) | 11.47 | 9.05 | 7.99 | 6.46 | 5.16 | (4) | — |
| 1A (2) | 11.45 | 8.94 | 7.90 | 6.40 | 4.98 | (5) | — |
| 2 (3) | 11.43 | 9.75 | 8.62 | 7.62 | 6.43 | 5.41 | 4.48 (6) |

Notes:
(1) Standard cells with PbO/CdO (no HgO)
(2) Standard cells with 1% HgO
(3) Cells same as (1) with PbO/CdO/$Bi_2O_3$
(4) Failed (capacity < 4.25 Ah) after 141 cycles (all three cells)
(5) Failed for the same reason, after 135, 141 and 135 cycles (avg. = 137 cycles)
(6) Failed for the same reason after 190, 191 and 194 cycles (avg. = 192 cycles)

It will be seen from the results shown in Table 2 that the silver-zinc cells with zinc electrodes containing bismuth oxide ($Bi_2O_3$) showed a significantly improved performance over the standard cells, without $Bi_2O_3$ after only 30 cycles.

The results shown in both Tables 1 and 2 above clearly demonstrate a synergistic improvement of the bismuth oxide containing electrodes over the standard electrodes employing only lead oxide and cadmium oxide. A similar synergistic effect would be expected with electrodes containing bismuth oxide and either lead oxide or cadmium oxide alone as the additive.

EXAMPLE 3

A group of 8.5 Ah cells, similar to those described in example 1, variation No. 2, except that the negative electrodes were made with an improved procedure whereby the additives are pre-mixed in water, thus ensuring a more thorough mixing of the additives into the active material were fabricated. The cells were tested under the same regime as described in the previous examples. The cells containing bismuth oxide reached 365 cycles before their capacity fell below 4.25 Ah, while standard cells without bismuth failed after 199 cycles.

EXAMPLE 4

A group of 200 Ah prismatic cells, consisting of 14 positive and 15 negative electrodes, built in the "dry charged" (AgO/Zn) condition, and a separator equivalent to six wraps of silver treated cellophane, containing 563g of active silver and 492g of zinc (including additives) was tested on a 50 cycle regime, including 40 low-rate (16.25A) 62.5% depth of discharge cycles, 5 low rate, full capacity discharges and 5 high rate discharges (165A for 60 minutes). Comparing cells of the same design, but with (1) 1% PbO+2% CdO and (2) 1% PbO+2% CdO+5% $Bi_2O_3$ additives, the following results were obtained.

TABLE 3

| | PbO/CdO | PbO/CdO/$Bi_2O_3$ |
|---|---|---|
| 1) Capacity loss per cycle, low rate cycles (%) | 0.60 | 0.40 |
| 2) No. of successful (1) high rate cycles (max. = 5) | 2 | 5 |

Note: (1) completed 60 minutes above 1.30 V

EXAMPLE 5

A group of 30 Ah prismatic cells, with 6 positive and 7 negative electrodes built in the "dry unformed" (Ag/ZnO) condition, and a separator system including five layers of silver treated cellophane, containing 98g of active silver and 89g of zinc (including additives) was manufactured and tested. The group included cells of the same design, except for the negative electrode additive, which was 1% PbO and 2% CdO for half of the cells, while the other half also contained 5% $Bi_2O_3$. The test regime consisted of a series of discharges at 3.8A for 7 hours (26.6 Ah output) which was continued until the cells could no longer deliver the required capacity, while remaining above the specified minimum voltage of 1.45V.

On the above regime, the cells with PbO and CdO alone fell below 26.6 Ah in 21 cycles, while those which also contained $Bi_2O_3$ lasted 42 cycles.

In summary, cells of capacities ranging from 8.5 to 200 ampere hours (Ah) were built and tested, as described in examples 1 through 5. Some of these cells were made with lead oxide and cadmium oxide additives in the negative electrodes, while others also included bismuth oxide. The results of these tests are shown in Table 4 below.

TABLE 4

PERFORMANCE OF SILVER-ZINC CELLS
WITH AND WITHOUT BISMUTH OXIDE (1)

| Example No. | % DoD (*) | Capacity (Ah) | | | No. Cycles to Failure (3) | | |
|---|---|---|---|---|---|---|---|
| | | Nominal | Initial | Final | Cells w. Bi | Cells w.o. Bi | % Diff. |
| 1 | 50.0 | 8.5 | 8.86 | 4.25 | 151 | 111 | +36.0 |
| 2 | 50.0 | 8.5 | 11.43 | 4.25 | 192 | 141 | +36.2 |
| 3 | 50.0 | 8.5 | 11.30 | 4.25 | 365 | 199 | +83.4 |
| 4 | 65–83 | 200 | 210.2 | 176.2 | 50(4) | 30 | >+66.7 |
| 5 | 88.7 | 30 | 40.1 | 26.6 | 42 | 21 | +100.0 |

Notes:
(1) 5% (with 1% PbO and 2% CdO)
(2) Based on nominal capacity
(3) Capacity below shallow cycle requirements
(4) Cells did not fail
(*) DOD: depth of discharge It will be seen from the results shown in Table 4 that cells employing zinc electrodes containing both bismuth oxide and a mixture of lead oxide and cadmium oxide demonstrated consistently improved cycle life over essentially the same cells employing lead oxide and cadmium oxide but without the bismuth oxide additive.

What is claimed is:

1. A rechargeable alkaline silver-zinc electrochemical cell comprising, a positive and a negative electrode having a separator therebetween containing an alkaline electrolyte, said positive electrode containing silver as a positive active material, said negative electrode comprising predominantly zinc or zinc oxide as the negative active material and an additive consisting essentially of bismuth oxide and at least one additional oxide or hydroxide of a metal selected from the group consisting of lead, cadmium and indium, the amount of said bismuth oxide ranging from about 2.0% by wt. to about 10% by wt and the amount of said additional oxide or hydroxide in each instance ranging from about 0.25% by wt. to about 2% by wt. of said negative active material.

2. A rechargeable alkaline silver-zinc electrochemical cell according to claim 1, wherein the amount of bismuth oxide ranges from about 2% by wt. to about 5% by wt. of said negative active material.

3. A rechargeable alkaline silver-zinc electrochemical cell according to claim 1, wherein said at least one additional oxide or hydroxide is selected from the group consisting of lead oxide, cadmium oxide, and indium hydroxide.

4. A rechargeable alkaline silver-zinc electrochemical cell according to claim 3, wherein said additive comprises bismuth oxide and lead oxide.

5. A rechargeable alkaline silver-zinc electrochemical cell according to claim 4, wherein the amount of said lead oxide ranges from about 0.5% by wt. to about 2% by wt. of said negative active material.

6. A rechargeable alkaline silver-zinc electrochemical cell according to claim 3, wherein said additive comprises bismuth oxide and cadmium oxide.

7. A rechargeable alkaline silver-zinc electrochemical cell according to claim 6, wherein the amount of said cadmium oxide ranges from about 1.0% by wt. to about 2% by wt. of said negative active material.

8. A rechargeable alkaline silver-zinc electrochemical cell according to claim 3, wherein said additive comprises bismuth oxide and indium hydroxide.

9. A rechargeable alkaline silver-zinc electrochemical cell according to claim 8, wherein the amount of said indium hydroxide ranges from about 0.25% by wt. to about 1% by wt. of said negative active material.

10. A rechargeable alkaline silver-zinc electrochemical cell according to claim 3, wherein said additive comprises bismuth oxide and a mixture of lead oxide and cadmium oxide.

11. A rechargeable alkaline silver-zinc electrochemical cell according to claim 10, wherein the amount of lead oxide ranges from about 0.5% by wt. to about 2% by wt. and the amount of cadmium oxide ranges from about 1.0% by wt. to about 2.0% by wt. of said negative active material.

12. A rechargeable alkaline silver-zinc electrochemical cell according to claim 10, wherein said additive comprises about 5% by wt. bismuth oxide, about 2% by wt. cadmium oxide and about 1% by wt. lead oxide based on the weight of said negative active material.

13. A rechargeable alkaline silver-zinc electrochemical cell according to claim 10, wherein said separator comprises at least one inner separator layer composed of woven nylon and an outer main separator composed of multiple layers of silver treated cellophane.

14. A rechargeable alkaline silver-zinc electrochemical cell comprising, a positive and a negative electrode having a separator therebetween containing an alkaline electrolyte, said positive electrode containing silver as the positive active material, said negative electrode comprising predominantly zinc or zinc oxide as the negative active material and an additive consisting essentially of from about 2% by wt. to about 5% by wt. bismuth oxide, from about 0.5% by wt. to about 2% by wt. lead oxide and from about 1.0% by wt. to about 2.0% by wt. cadmium oxide, based on the weight of said negative active material.

* * * * *